US011112801B2

(12) United States Patent
Song et al.

(10) Patent No.: US 11,112,801 B2
(45) Date of Patent: Sep. 7, 2021

(54) OPERATION METHOD OF A ROBOT FOR LEADING A FOLLOWER

(71) Applicant: National Chiao Tung University, Hsinchu (TW)

(72) Inventors: Kai-Tai Song, New Taipei (TW); Yu-Heng Chiu, New Taipei (TW); Shao-Huan Song, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 322 days.

(21) Appl. No.: 16/364,585

(22) Filed: Mar. 26, 2019

(65) Prior Publication Data
US 2020/0033864 A1    Jan. 30, 2020

(30) Foreign Application Priority Data
Jul. 24, 2018    (TW) ................................ 107125557

(51) Int. Cl.
*G01C 22/00*   (2006.01)
*G05D 1/00*    (2006.01)
*G05D 1/02*    (2020.01)

(52) U.S. Cl.
CPC ........... *G05D 1/0217* (2013.01); *G05D 1/024* (2013.01); *G05D 1/0276* (2013.01); *G05D 2201/02* (2013.01)

(58) Field of Classification Search
CPC .... G05D 1/0217; G05D 1/024; G05D 1/0276; G05D 2201/02
USPC ......................................................... 701/23
See application file for complete search history.

(56) References Cited

U.S. PATENT DOCUMENTS

| 9,817,395 B2* | 11/2017 | Sisbot ................ G01C 21/3407 |
| 2006/0058921 A1* | 3/2006 | Okamoto ............. G05D 1/0214 700/255 |
| 2019/0121360 A1* | 4/2019 | Zhao ..................... G01S 17/931 |
| 2019/0179307 A1* | 6/2019 | Anderson ............... A47L 11/28 |

(Continued)

FOREIGN PATENT DOCUMENTS

| CN | 105108754 B | 8/2017 | |
| JP | H11211395 A * | 8/1999 | ............... F41G 3/22 |
| TW | I384249 B | 2/2013 | |

OTHER PUBLICATIONS

English Translation for JPH11211395A.*

(Continued)

*Primary Examiner* — Mahmoud S Ismail
(74) *Attorney, Agent, or Firm* — Hammer & Associates, P.C.

(57) ABSTRACT

An operation method of a robot for leading a follower to a destination within an open space includes: calculating a distance between the follower and the robot; when it is determined that the distance is not greater than a threshold, determining a pre-movement location of the robot in the open space and an orientation of the robot, and calculating a linear speed and an angular speed for the robot based on the pre-movement location and the orientation of the robot and the destination; moving according to the linear speed and the angular speed; determining whether the robot has arrived at the destination according to the current position; and repeating the previous steps when it is determined that the robot has not arrived at the destination.

13 Claims, 12 Drawing Sheets

(56) References Cited

U.S. PATENT DOCUMENTS

2019/0345000 A1* 11/2019 Park ..................... B66B 1/461
2020/0088524 A1* 3/2020 Shin ..................... B25J 9/16
2020/0089252 A1* 3/2020 Kim ..................... G05D 1/12
2020/0130197 A1* 4/2020 Roh ..................... B25J 19/04
2020/0164515 A1* 5/2020 Han ..................... B25J 9/1666

OTHER PUBLICATIONS

R. Triebel et al., "Spencer: A Socially Aware Service Robot for Passenger Guidance and Help in Busy Airports," in Proc. of the 10th Conference on Field and Service Robotics( FSR 2015), Toronto, Canada, 2015, pp. 607-622.

R. Stricker et al., "Interactive Mobile Robots Guiding Visitors in a University Building," in Proc. of 2012 IEEE RO-MAN: The 21st IEEE International Sympo-sium on Robot and Human Interactive Communication, Paris, 2012, pp. 695-700.

K. Yelamarthi, S. Sherbrook, J. Beckwith, M. Williams and R. Lefief, "An RFID Based Autonomous Indoor Tour Guide Robot," in Proc. of 2012 IEEE 55th In-ternational Midwest Symposium on Circuits and Systems (MWSCAS), Boise, ID, USA, 2012, pp. 562-565.

* cited by examiner

OPERATION METHOD OF A ROBOT FOR LEADING A FOLLOWER

CROSS-REFERENCE TO RELATED APPLICATION

This application claims priority of Taiwanese Patent Application No. 107125557, filed on Jul. 24, 2018.

FIELD

The disclosure relates an operation method of a robot for leading a follower from a start location to a destination within an open space.

BACKGROUND

Robots have been employed for the use of guiding a follower. Conventionally, a robot is configured to move to a destination at a constant speed. In such a case, when the follower stops or slows down due to, for example, an unexpected occurrence, the robot may not be able to "be aware" of that situation, and may thus continue to move toward the destination at the same constant speed. As a result, the follower may be left alone by the robot.

SUMMARY

Therefore, an object of the disclosure is to provide an operation method of a robot for leading a follower from a start location to a destination within an open space.

According to one embodiment of the disclosure, the robot includes a main body, a front laser scanner that is disposed at a front side of the main body for scanning the front of the main body, a rear laser scanner that is disposed at a rear side of the main body for scanning the rear of the main body, a storage unit that stores a map of the open space, a motion control unit disposed at the main body for driving the main body to move within the open space, and a processing unit communicating with the front laser scanner, the rear laser scanner and the motion control unit. The method includes steps of:

scanning, by the rear laser scanner, the rear of the main body within a plurality of rear angular ranges to obtain a plurality of rear-scanning data sets that correspond to the plurality of rear angular ranges, respectively;

A) calculating, by the processing unit, a distance between the follower and the main body based on the plurality of rear-scanning data sets currently obtained by the rear laser scanner;

B) determining, by the processing unit, whether the distance between the follower and the main body is greater than a threshold;

C) when it is determined that the distance between the follower and the main body is not greater than the threshold, controlling, by the processing unit, the front laser scanner to scan the front of the main body within a plurality of front angular ranges, so as to obtain a plurality of front-scanning data sets that correspond to the plurality of front angular ranges, respectively, determining, by the processing unit, a pre-movement location of the main body in the open space and an orientation of the main body based on the map and the plurality of front-scanning data sets currently obtained by the front laser scanner, and determining, by the processing unit, a linear speed and an angular speed for the main body based on at least the pre-movement location and the orientation of the main body, the destination and the map;

D) generating, by the processing unit, a movement command according to the linear speed and the angular speed and transmitting, by the processing unit, the movement command to the motion control unit;

E) driving, by the motion control unit, the main body to move according to the movement command;

F) determining, by the processing unit, a current position of the main body in the open space based on the map and the plurality of front-scanning data sets currently obtained by the front laser scanner, and whether the main body has arrived at the destination according to the current position; and G) repeating steps A) to F) when it is determined that the main body has not arrived at the destination.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
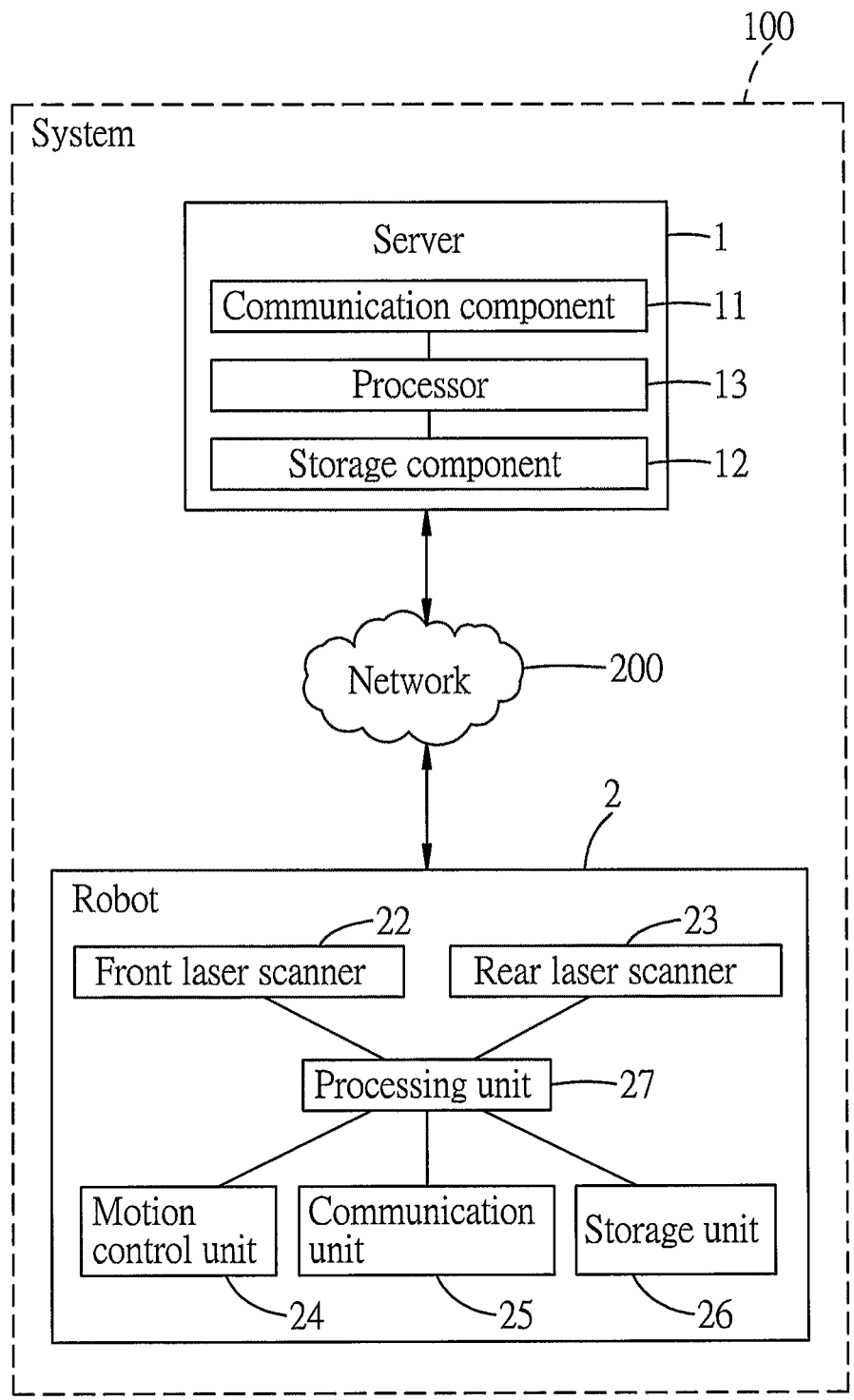
FIG. 1 is a block diagram illustrating a system that includes a robot according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a system 100 according to one embodiment of the disclosure. In this embodiment, the system 100 includes a server 1, and a robot 2 that communicates with the server 1 via a network 200 (e.g., the Internet).

The server 1 may be embodied using a personal computer, a server device, a cloud host, etc., and includes a communication component 11, a storage component 12 and a processor 13.

The processor 13 is coupled to the communication component 11 and the storage component 12, and may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication component 11 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The storage component 12 may be embodied using a hard disk, a solid state disk, a flash drive, or various types of non-transitory storage medium.

Figure 2:
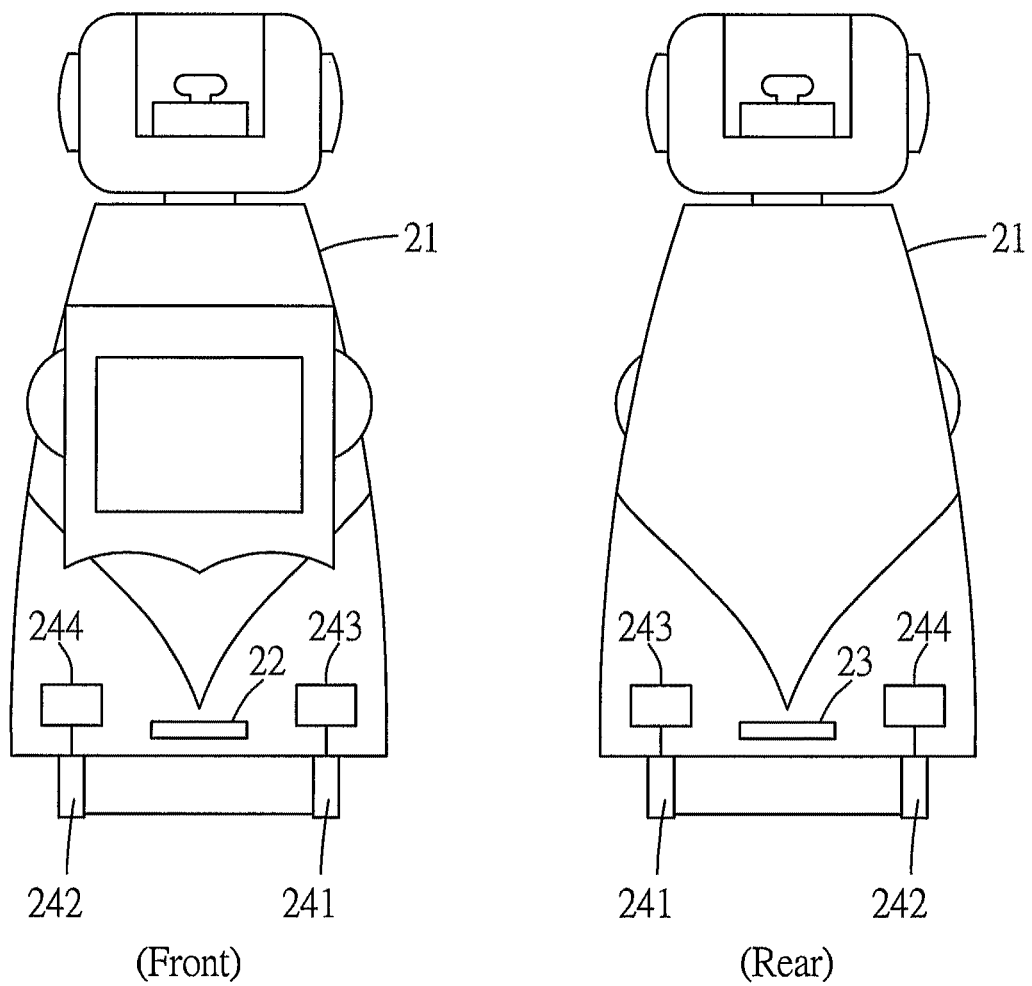
FIG. 2 is a schematic view illustrating a front side and a rear side of the robot according to one embodiment of the disclosure.

Further referring to FIG. 2, the robot 2 includes a main body 21, a front laser scanner 22, a rear laser scanner 23, a motion control unit 24, a communication unit 25, a storage unit 26 and a processing unit 27.

Figure 3:
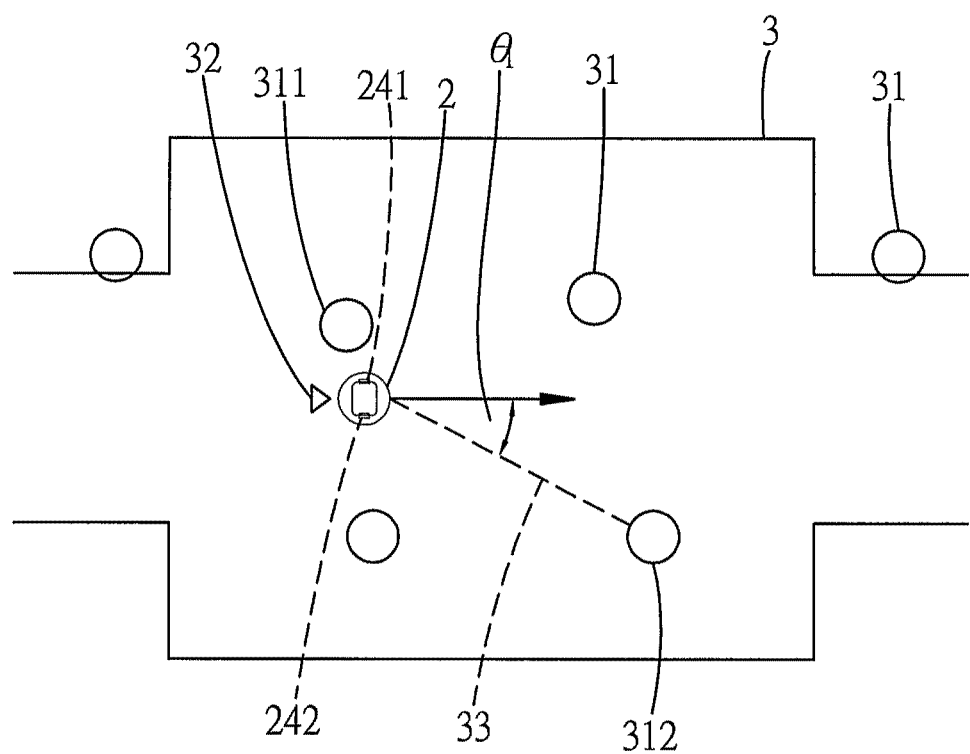
FIG. 3 is a top schematic view of an open space in which a plurality of stations are set up.

The robot 2 is to be placed in an open space 3 that has one or more stations 31 (see FIG. 3) set up therein. In one embodiment, the open space 3 is a physical examination center (e.g., a hospital, a medical center, etc.), and the stations 31 may be rooms/locations within the physical examination center, each providing one specific type of examination (e.g., X-ray room, blood collection room, etc.). It is noted that for a physical examination, a person typically needs to undergo several types of examinations, and therefore may need to visit several stations 31 in the open space 3. Additionally, a large number of people may be simultaneously in the physical examination center waiting to undergo different types of examinations.

The front laser scanner 22 is disposed at a front side of the main body 21 for scanning the front of the main body 21 (spaces in front of the main body 21) (see a left part of FIG. 2). The rear laser scanner 23 is disposed at a rear side of the main body 21 for scanning the rear of the main body 21 (spaces behind the main body 21) (see a right part of FIG. 2). The motion control unit 24 is disposed at the main body 21 for driving the main body 21 to move within the open space 3. The processing unit 27 is electrically connected to and communicates with the front laser scanner 22, the rear laser scanner 23, the motion control unit 24, the communication unit 25 and the storage unit 26.

The front laser scanner 22 and the rear laser scanner 23 may be embodied using laser scanning devices that are known in the art, and are capable of scanning a specific angular range (e.g., 180 degrees). In one implementation, each of the front and rear laser scanners 22, 23 is a 180-degree laser scanner. In one example, the front laser scanner 22 and the rear laser scanner 23 may be configured to perform a plurality of scans in respective angular ranges within the specific angular range (e.g., every 10 degrees of the 180-degree range). For each scan performed, the front/rear laser scanner 22, 23 obtains a distance to a nearest object associated with the respective angular range.

It is noted that the communication unit 25, the processing unit 27 and the storage unit 26 of the robot 2 may be embodied using the same or similar hardware/software combinations as the communication component 11, the processor 13 and the storage component 12, respectively.

In this embodiment, the motion control unit 24 includes a first motor 243 and a second motor 244, a first wheel 241 disposed at a left side of the main body 21 and driven by the first motor 243, and a second wheel 242 disposed at a right side of the main body 21 and driven by the second motor 244.

The storage unit 26 stores a map of the open space 3. In this embodiment, the map of the open space 3 is constructed using Cartographer simultaneous localization and mapping (SLAM) based on laser scanning information regarding the open space 3. The laser scanning information may be obtained by, for example, controlling the main body 21 of the robot 2 to move within the open space 3, and activating the front laser scanner 22 to scan the open space 3.

Figure 4:
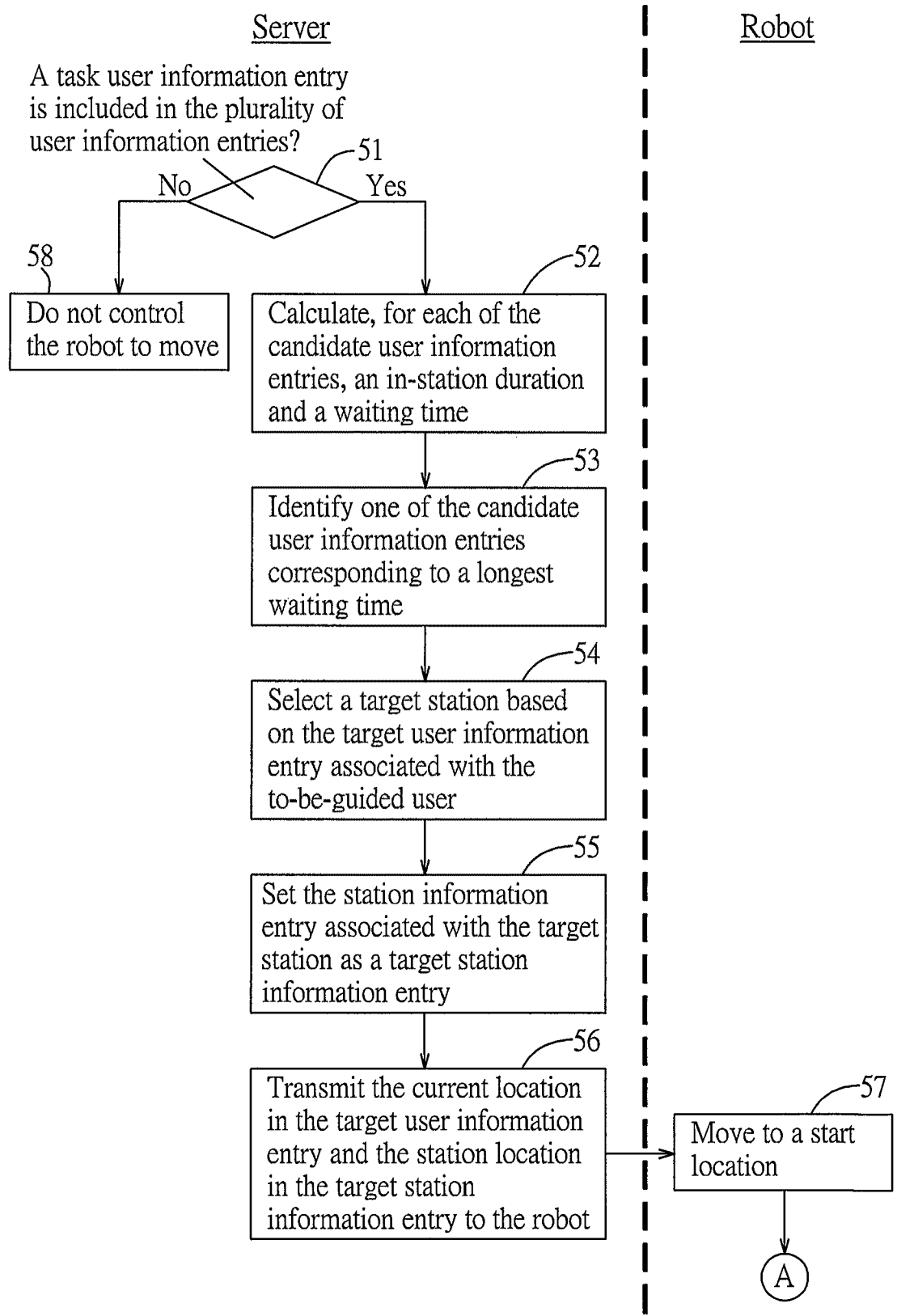
FIG. 4 is a flow chart illustrating steps of a procedure for assigning a task for the robot, according to one embodiment of the disclosure.

FIG. 4 is a flow chart illustrating steps of a procedure for assigning a task for the robot 2, according to one embodiment of the disclosure. In this embodiment, the procedure is implemented by the system as shown in FIG. 1.

Specifically, in this embodiment, the storage component 12 stores a plurality of user information entries associated respectively with a plurality of users, and a plurality of station information entries associated respectively with the stations 31 in the open space 3.

Each of the plurality of user information entries includes a progress report indicating whether the respective user has visited each of the stations 31 (e.g., the progress report may indicate which station(s) 31 the respective user has already visited), a current location indicating a station 31 where the respective user is currently staying in the open space 3 (hereinafter referred to as a current station), and an arrival time when the respective user arrived at the current station 31. Each of the plurality of station information entries includes a station location of the respective station in the open space 3, and an expected staying duration, during which a user is expected to stay at the respective station 31 (e.g., an average time for performing a specific examination at the respective station 31).

In step 51, the processor 13 of the server 1 determines whether a task user information entry is included in the plurality of user information entries. That is to say, the determination is performed to find whether there is at least a person who has not yet completed all examinations.

In this embodiment, the determination is performed according to the progress reports respectively of the plurality of user information entries. The progress report in the candidate user information entry indicates that at least one station 31 is yet to be visited by the user.

When it is determined that at least one candidate user information entry is included in the plurality of user information entries, the flow proceeds to step 52. Otherwise (that there is currently no one who has not yet completed all examinations), the flow proceeds to step 58, in which the server 1 does not control the robot 2 to move, and may repeat step 51 again after a preset time period (e.g., 1 minute).

In step 52, when it is determined that multiple candidate user information entries are included in the plurality of user information entries, the processor 13 of the server 1 calculates, for each of the candidate user information entries, an in-station duration (i.e., how long the respective user has been staying at the current station 31) based on a current time and the arrival time in the candidate user information entry, and a waiting time based on the in-station duration and the expected staying duration in one of the plurality of station information entries that is associated with the station 31 at the current location in the candidate user information entry.

Specifically, the in-station duration may be calculated as a difference between the current time and the arrival time. The waiting time may be calculated as the in-station duration minus the expected staying duration, and represents a time the user has been waiting at the current station 31 after the expected staying duration has elapsed.

In step 53, the processor 13 of the server 1 identifies one of the candidate user information entries corresponding to a longest waiting time. The user associated with the identified one of the candidate user information entries (herein after referred to as target user information entry) may be identified as a to-be-guided user.

It is noted that in the cases that only one candidate user information entry is identified in step 51, steps 52 and 53 may be omitted, since only one person qualifies as the candidate for the to-be-guided user. Additionally, in other embodiments, the to-be-guided user may be determined using other standards.

Afterward, in step 54, the processor 13 of the server 1 selects a target station from the stations 31, based on the target user information entry associated with the to-be-guided user.

Figure 5:
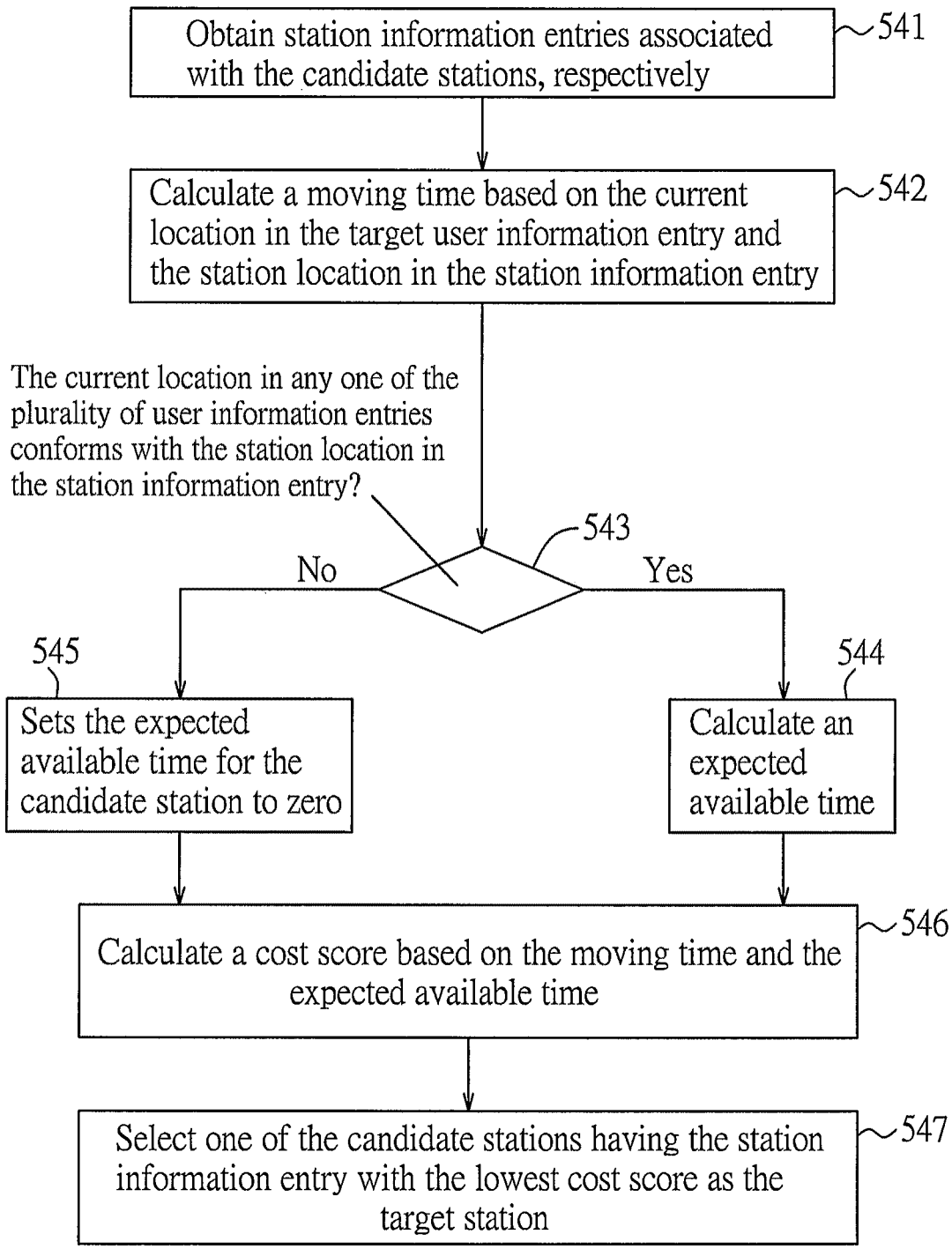
FIG. 5 is a flow chart illustrating sub-steps of a procedure for selecting a target station, according to one embodiment of the disclosure.

In this embodiment, the target station may be selected using the sub-steps as illustrated in FIG. 5.

It is noted that when it is determined, based on the target user information entry, that only one station 31 has not yet been visited by the to-be-guided user, that station 31 is directly selected as the target station.

In sub-step 541, when it is determined that there are multiple stations 31 that are yet to be visited by the to-be-guided user (hereinafter referred to as candidate stations 31) according to the progress report, the processor 13 of the server 1 obtains station information entries associated with the candidate stations 31, respectively.

In sub-step 542, for each of the station information entries associated with the candidate stations 31, the processor 13 of the server 1 calculates a moving time based on the current location in the target user information entry and the station location in the station information entry.

Specifically, the moving time may be calculated by first obtaining a distance between the current position of the to-be-guided user (i.e., the current location) and the station location. Then, the distance may be divided by a preset walking speed (e.g., between 3.75 to 5.43 kilometers per hour) to obtain the moving time.

Then, sub-steps 543-545 are performed in respect of each of the candidate stations 31. In sub-step 543, for the station information entry associated with the candidate station 31, the processor 13 of the server 1 determines whether the current location in any one of the plurality of user information entries conforms with the station location in the station information entry. That is to say, the determination in sub-step 543 is to find out whether another person is currently occupying the candidate station 31.

When it is determined that the current location in one of the plurality of user information entries conforms with the station location in the station information entry (i.e., the candidate station 31 is currently occupied), the flow proceeds to sub-step 544. Otherwise, the flow proceeds to sub-step 545.

In sub-step 544, for the station information entry associated with the candidate station, the processor 13 of the server 1 calculates an expected available time based on the expected staying duration in the station information entry, a current time, and the arrival time in said one of the plurality of user information entries the current location of which conforms with the station location. The expected available time indicates a time period after which the candidate station 31 is expected to become vacant, and therefore is available to the to-be-guided user.

Specifically, the expected available time for a specific station 31 may be calculated by first calculating the in-station duration for a user occupying the station 31 (which is a difference between the current time and the arrival time at the specific station 31 of the user occupying the station 31), and subtracting the calculated in-station duration from the expected staying duration associated with the station 31. In cases that the in-station duration is larger than the expected staying duration, the expected available time for the station 31 is set to zero.

In sub-step 545, the processor 13 of the server 1 sets the expected available time for the candidate station 31 to zero, meaning that the candidate station 31 is currently available.

In sub-step 546, for each of the station information entries associated with the candidate stations, the processor 13 of the server 1 calculates a cost score based on the moving time and the expected available time.

In sub-step 547, the processor 13 of the server 1 selects one of the candidate stations 31 having the station information entry with the lowest cost score (as compared to the other candidate stations) as the target station. As such, the target station is obtained and the flow proceeds to step 55.

In step 55, the processor 13 of the server 1 sets the station information entry that is associated with the target station as a target station information entry.

In step 56, the processor 13 of the server 1 controls the communication component 11 to transmit the current location in the target user information entry and the station location in the target station information entry to the robot 2.

While in this embodiment only one robot 2 is present, in other embodiments, multiple robots 2 may be provided in the open space 3, each being in one of a standby mode and a working mode. In such cases, the processor 13 of the server 1 may control the communication component 11 to transmit the current location in the target user information entry and the station location in the target station information entry to one of the robots 2 that is determined to be in the standby mode.

In response, in step 57, the processing unit 27 of the robot 2 controls the motion control unit 24 to move the robot 2 to a start location 311, so as to start leading a follower 32 (a small triangle is used to represent the follower in FIG. 3) from the start location 311 to a destination 312. In this embodiment, the current location in the target user information entry is used as a start location 311, the to-be-guided user associated with the target user information entry is the follower 32, and the station location of the target station information entry is used as the destination 312.

It is noted that the operations regarding movement of the robot 2 is readily known in the art, and therefore details thereof are omitted herein for the sake of brevity.

Figure 6:
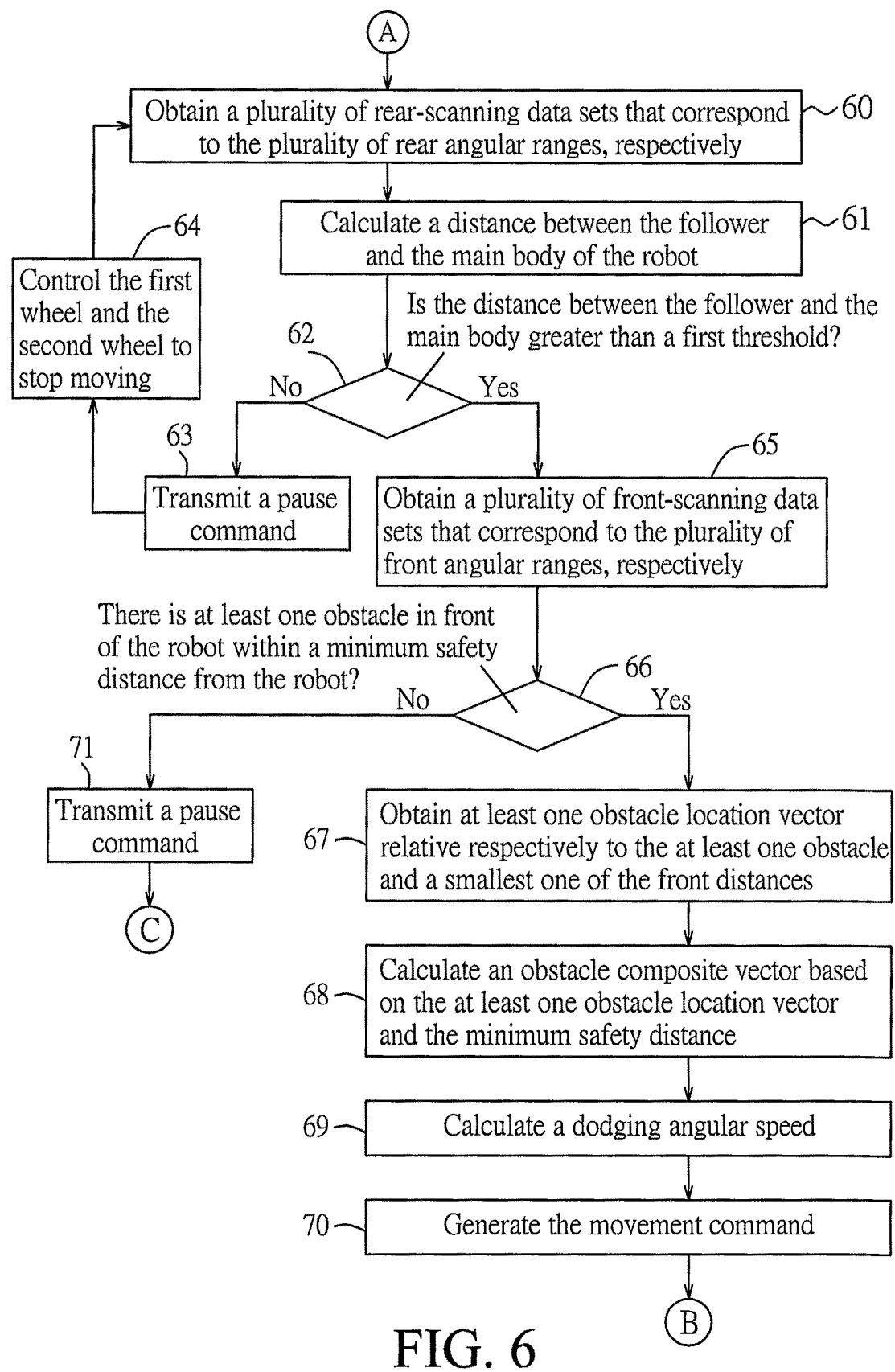
FIGS. 6 and 7 compose a flow chart illustrating steps of an operation method of a robot for leading a follower from a start location to a destination within an open space according to one embodiment of the disclosure.
Figure 7:
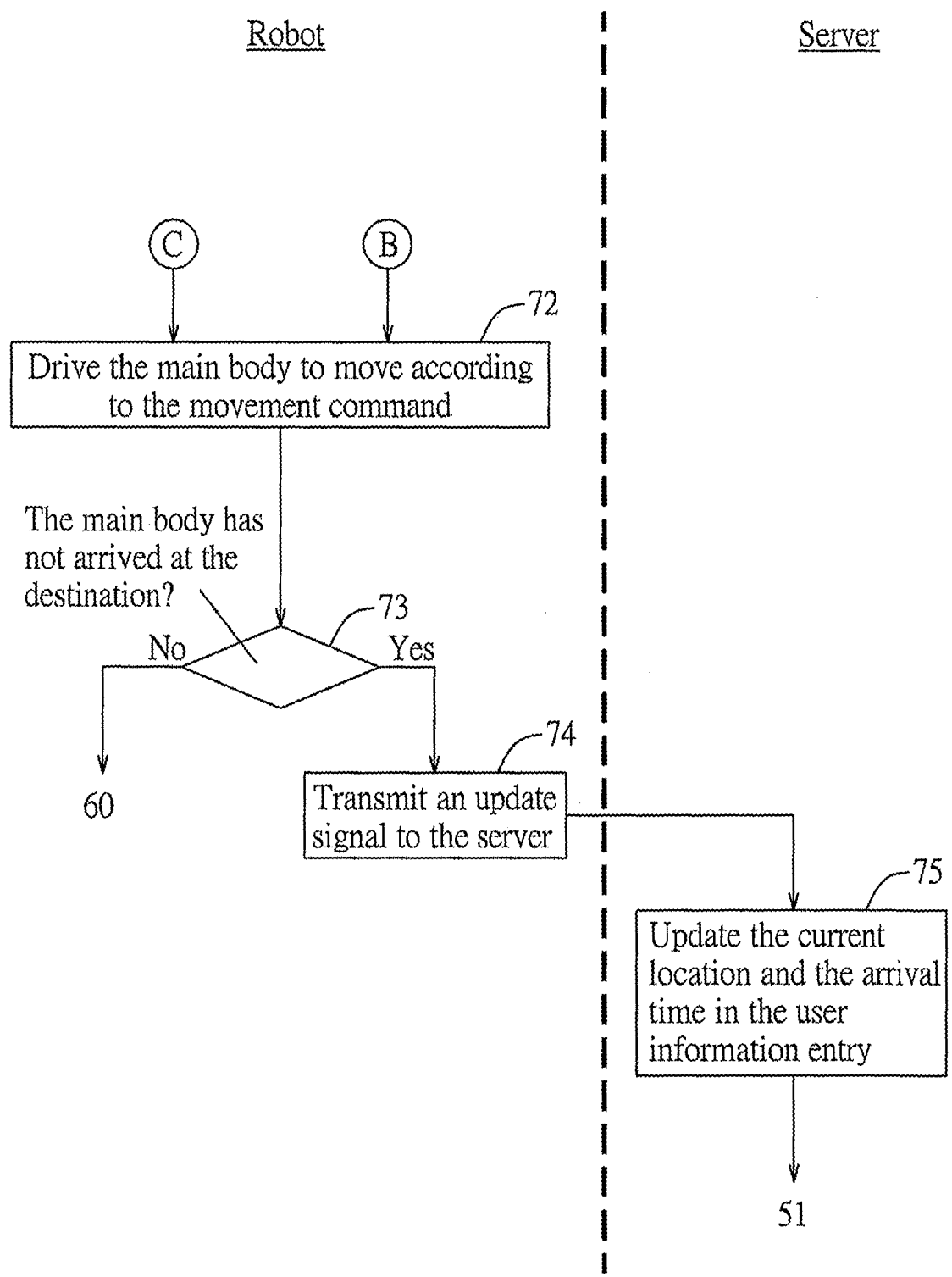

FIGS. 6 and 7 compose a flow chart illustrating an operation method of a robot for leading a follower from a start location to a destination within an open space according to one embodiment of the disclosure. In this embodiment, the method is implemented by the robot 2 as shown in FIGS. 1 and 2.

In step 60, the rear laser scanner 23 is controlled to scan the rear of the main body 21 within a plurality of rear angular ranges to obtain a plurality of rear-scanning data sets that correspond to the plurality of rear angular ranges, respectively. In one embodiment, the scanning by the rear laser scanner 23 is performed continuously after the robot 2 has moved to the start location.

In step 61, the processing unit 27 of the robot 2 calculates a distance between the follower 32 and the main body 21 of the robot 2, based on the plurality of rear-scanning data sets currently obtained by the rear laser scanner 23.

Figure 8:
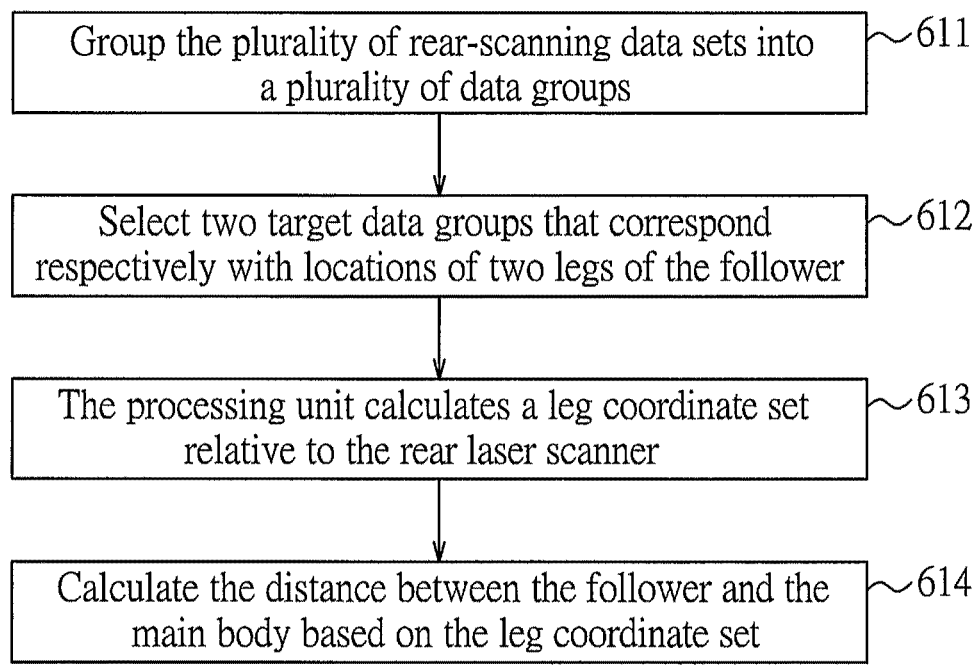
FIG. 8 is a flow chart illustrating sub-steps of a procedure for calculating a distance between a follower and a main body of the robot according to one embodiment of the disclosure.

Specifically, the distance between the follower 32 and the main body 21 may be calculated using the sub-steps as shown in FIG. 8. Each of the plurality of rear-scanning data sets includes the corresponding one of the rear angular ranges, and a measured distance that is measured along a middle angular position within the corresponding one of the rear angular ranges. The measured distance indicates a distance of an object from the location of the rear laser scanner 23.

In sub-step 611, the processing unit 27 groups the plurality of rear-scanning data sets into a plurality of data groups. In each of the plurality of data groups, the rear angular ranges respectively of the rear-scanning data sets are non-overlapping and cooperatively constitute the entirety of an uninterrupted, broader angular range (e.g., a 30-degree range), and a difference between the measured distances respectively of two rear-scanning data sets including the rear angular ranges that are adjacent to each other is smaller than a predetermined floor threshold (e.g., 50 millimeters). That is to say, one data group indicates one object, and when it is determined that a difference between the measured distances of two rear-scanning data sets is larger than the predetermined floor threshold, the processing unit 27 determines that the measured distances indicate two different objects, and should be grouped into different data groups.

In sub-step 612, the processing unit 27 selects, from the plurality of data groups, two target data groups that correspond respectively with locations of two legs of the follower 32.

Figure 9:
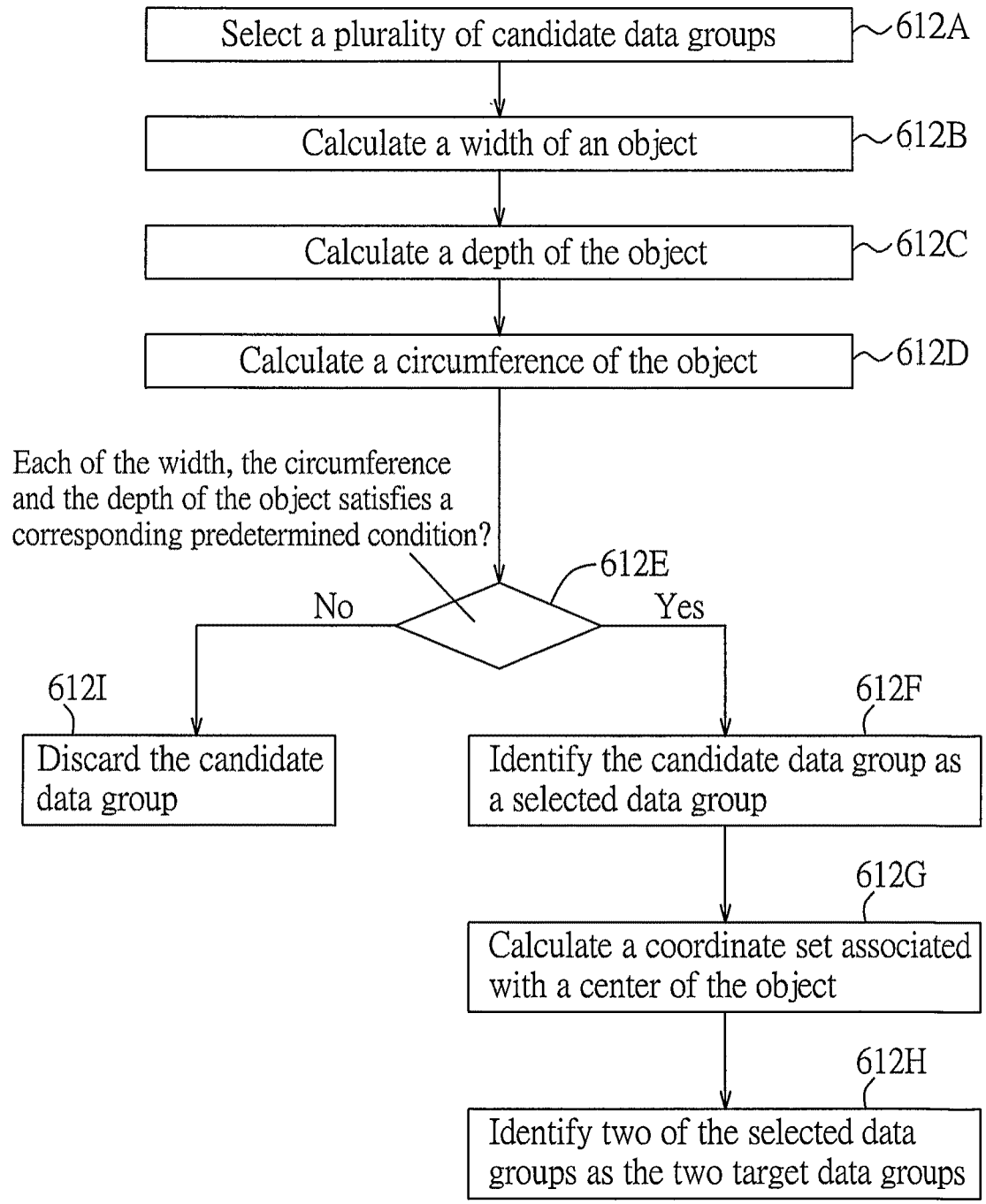
FIG. 9 is a flow chart illustrating sub-steps of a procedure for selecting two target data groups that correspond respectively with locations of two legs of the follower according to one embodiment of the disclosure.

Specifically, the two target data groups thus selected corresponding respectively with the locations of the legs of the follower 32 may be selected using the sub-steps as shown in FIG. 9.

In sub-step 612A, the processing unit 27 selects, from the plurality of data groups, a plurality of candidate data groups, where a number of the rear-scanning data sets in each of the plurality of candidate data groups is larger than a predetermined number. In this embodiment, the predetermined number is five. Any candidate data group with the number of the rear-scanning data sets that is smaller than the predetermined number is deemed noise and thus discarded.

In sub-step 612B, the processing unit 27 calculates, for each of the candidate data groups, a width of an object detected by the rear laser scanner 23, based on the rear-scanning data sets in the candidate data group. Specifically, the processing unit 27 defines a coordinate system with the rear laser scanner 23 serving as a reference point, and for a specific candidate data group, the processing unit 27 determines two rear-scanning data sets that define an object (e.g., one at the most left and one at the most right), and calculates two coordinate points associated with the two rear-scanning data sets, respectively. Using the two coordinate points, the processing unit 27 then calculates a width of the object.

In sub-step 612C, the processing unit 27 calculates, for each of the candidate data groups, a depth of the object, based on the rear-scanning data sets in the candidate'data group. In this embodiment, the processing unit 27 calculates, for each of the rear-scanning data sets in the candidate data groups, a distance between a coordinate point of the rear-scanning data set and a line defined by the two coordinate points determined in sub-step 612B. The depth of the object is defined as a longest one of the distances thus calculated.

In sub-step 612D, the processing unit 27 calculates, for each of the candidate data groups, a circumference of the object, based on the rear-scanning data sets in the candidate data group.

Specifically, the circumference of the object is calculated by the following equation $$G_h = \sum_{i=0}^{m-1} \overline{P_i P_{i+1}},$$

where $G_h$ represents the circumference of the object, m represents a number of the rear-scanning data sets in the candidate data group, and $P_i$ represents the coordinate point of the $i^{th}$ one of the rear-scanning data sets.

In sub-step 612E, in respect of each of the candidate data groups, the processing unit 27 determines whether each of the width, the circumference and the depth of the object satisfies a corresponding predetermined condition. If the width, the circumference and the depth of the object of this candidate data group individually satisfy the corresponding predetermined conditions, this candidate data group is then identified in sub-step 612F as a selected data group (i.e., a selected data group is likely associated with a leg of human). Otherwise, the candidate data group is discarded in sub-step 612I.

In this embodiment, the predetermined conditions for the width, the circumference and the depth of the object may be represented by the following equations $$300 \text{ mm} \geq W_h \geq 50 \text{ mm}$$

$$150 \text{ mm} \geq D_h \geq 5 \text{ mm}$$

$$500 \text{ mm} \geq G_h \geq 100 \text{ mm},$$

where $W_h$ represents the width of the object, $D_h$ represents the circumference of the object, and $G_h$ represents the depth of the object.

In sub-step 612G, the processing unit 27 calculates, for each of the selected data group(s), a coordinate set associated with a center of the object. In this embodiment, the coordinate set may be a center of the line defined by the two coordinate points.

In sub-step 612H, the processing unit 27 identifies two of the selected data groups, a distance between the coordinate sets respectively of which satisfying a leg distance condition, as the two target data groups. In this embodiment, the leg distance condition indicates that the distance between the coordinate sets is smaller than 80 centimeters.

In sub-step 613, the processing unit 27 calculates a leg coordinate set relative to the rear laser scanner 23 based on the target data groups. In this embodiment, the leg coordinate set is a center point of the two centers of the objects (i.e., the two legs of the follower 32).

In sub-step 614, the processing unit 27 calculates the distance between the follower 32 and the main body 21 based on the leg coordinate set. Specifically, the processing unit 27 calculates the distance between the leg coordinate set and the reference point (i.e., the rear laser scanner 23).

In step 62, the processing unit 27 determines whether the distance between the follower 32 and the main body 21 is greater than a first threshold. In this embodiment, the first threshold is 100 centimeters. When it is determined that the distance between the follower 32 and the main body 21 is greater than the first threshold, the flow proceeds to step 63. When it is determined that the distance between the follower 32 and the main body 21 is not greater than the first threshold, the flow proceeds to step 65.

In step 63, the processing unit 27 transmits a pause command to the motion control unit 24.

In response, in step 64, the motion control unit 24 controls the first wheel 241 and the second wheel 242 to stop moving, and the flow goes back to step 61.

In step 65, the processing unit 27 controls the front laser scanner 22 to scan the front of the main body 21 within a plurality of front angular ranges, so as to obtain a plurality of front-scanning data sets that correspond to the plurality of front angular ranges, respectively. The processing unit 27 also determines a pre-movement location of the main body 21 in the open space 3 and an orientation of the main body 21 based on the map and the plurality of front-scanning data sets currently obtained by the front laser scanner 22.

Afterward, the processing unit 27 determines a linear speed and an angular speed for the main body 21 (which will be used to determine how the robot 2 is going to move) based on at least the pre-movement location and the orientation of the main body 21, the destination 312 and the map. In this embodiment, the location of the main body 21 is determined using adaptive Monte Carlo localization (AMCL).

Figure 10:
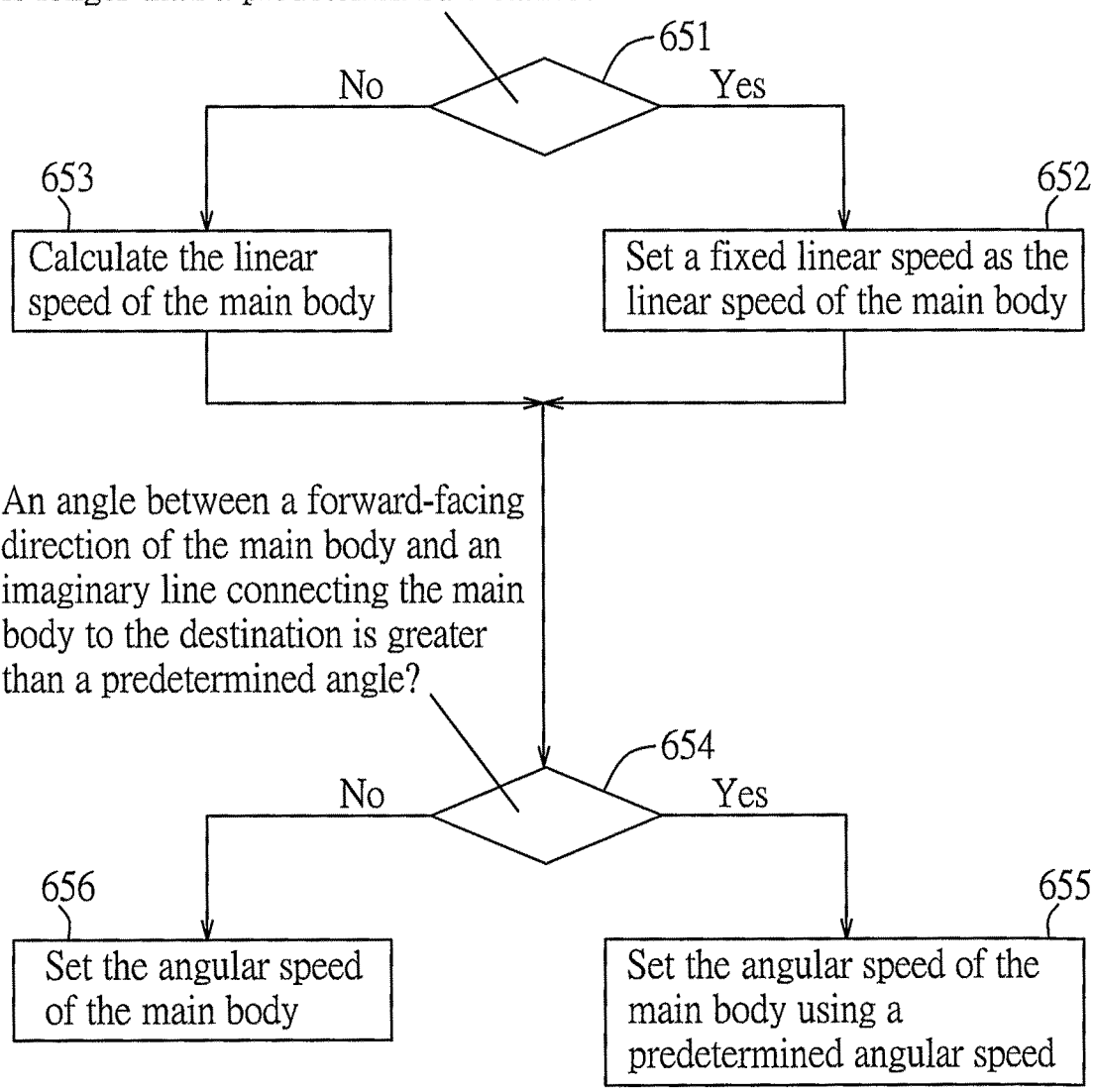
FIG. 10 is a flow chart illustrating sub-steps of a procedure for calculating a linear speed and an angular speed for the main body according to one embodiment of the disclosure.

The operations of step 65 may be implemented using the following sub-steps as shown in FIG. 10.

In sub-step 651, the processing unit 27 determines whether a distance between the pre-movement location of the main body 21 and the destination 312 (hereinafter referred to as "distance-to-destination") is longer than a predetermined distance. When it is determined that the distance-to-destination is longer than the predetermined distance, the flow proceeds to sub-step 652. Otherwise, the flow proceeds to sub-step 653. It is noted that in this embodiment, the predetermined distance is 80 centimeters.

In sub-step 652, the processing unit 27 sets a fixed linear speed as the linear speed of the main body 21. In this embodiment, the fixed linear speed is 40 cm/s.

In sub-step 653, the processing unit 27 calculates the linear speed of the main body 21 using the following equation $$V_g = \frac{D}{D_{bf}} V_{max}, \quad D \leq D_{bf},$$

where $V_g$ represents the linear speed, D represents the distance between the pre-movement location and the destination 312, $B_{max}$ represents the fixed linear speed (i.e., 40 cm/s), and $D_{bf}$ represents the predetermined distance.

In sub-step 654, the processing unit 27 determines whether an angle $\theta_1$ between a forward-facing direction of the main body 21 (determined based on the orientation of the main body 21) and an imaginary line 33 connecting the main body 21 to the destination 312 (hereinafter referred to as angle-of-destination) (see FIG. 3) is greater than a predetermined angle. When it is determined that the angle-of-destination $\theta_1$ is greater than the predetermined angle, the flow proceeds to sub-step 655. Otherwise, the flow proceeds to sub-step 656. It is noted that in this embodiment, the predetermined angle is 80 degrees.

In sub-step 655, the processing unit 27 sets the angular speed of the main body 21 using a predetermined angular speed. Specifically, the processing unit 27 sets the predetermined angular speed as the angular speed of the main body 21 when it is determined that the imaginary line 33 extends to the left of the main body 21, and sets a negative value of the predetermined angular speed as the angular speed of the main body 21 when it is determined that the imaginary line 33 extends to the right of the main body 21. In this embodiment, the predetermined angular speed is 0.698 radian/s.

In sub-step 656, when it is determined that the imaginary line 33 extends to the left of the main body 21, the processing unit 27 sets the angular speed of the main body 21 using the following equation $$\omega_g = \frac{\theta_1}{\theta_{bf}} \omega_{max},$$

where $\omega_g$ represents the angular speed of the main body 21, $\theta_{bf}$ represents the predetermined angle, and $\omega_{max}$ represents the predetermined angular speed.

On the other hand, when it is determined that the imaginary line 33 extends to the right of the main body 21, the processing unit 27 sets the angular speed of the main body 21 using the following equation $$\omega_g = -\frac{\theta_1}{\theta_{bf}} \omega_{max}.$$

Figure 11:
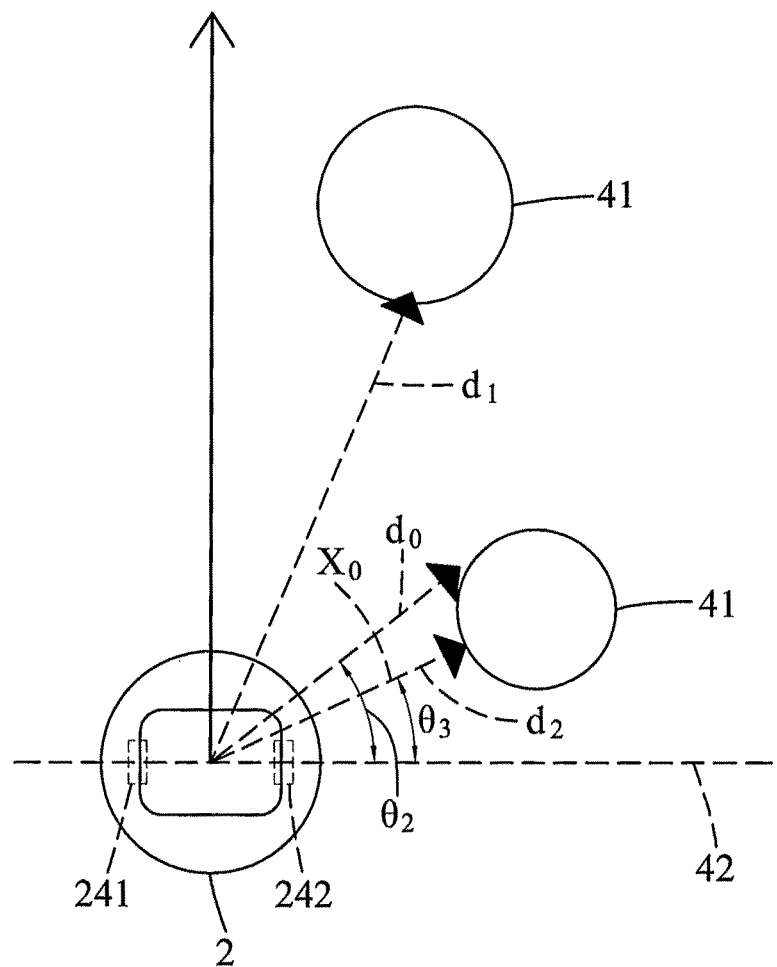
FIG. 11 is a top view illustrating the robot with a number of obstacles.

In step 66, the processing unit 27 further determines whether there is at least one obstacle 41 in front of the robot 2 within a minimum safety distance from the robot 2 (see FIG. 11). Further referring to FIG. 11, each of the plurality of front-scanning data sets obtained by the front laser scanner 22 includes the corresponding one of the front angular ranges and a front distance that is measured along a middle angle within the corresponding one of the front angular ranges (for instance, if the front angular range is from 10 to 20 degrees, then the middle angle is 15 degrees). The determination may be done by determining whether at least one of the front distances respectively of the plurality of front-scanning data sets is shorter than the minimum safety distance. In this embodiment, the minimum safety distance is 100 centimeters.

When the determination of step 66 is negative (i.e., there is no obstacle within the minimum safety distance from the robot 2 in front of the robot 2), the flow proceeds to step 71, in which the processing unit 27 generates a movement command according to the linear speed and the angular speed, and transmits the movement command to the motion control unit 24 for controlling the main body 21 to move in the linear speed and the angular speed. Otherwise, the flow proceeds to step 67.

In step 67, the processing unit 27 obtains at least one obstacle location vector relative respectively to the at least one obstacle 41 that is within the minimum safety distance from the robot 2 and a smallest one of the front distances $X_0$ based on the plurality of front-scanning data sets.

In this embodiment, the plurality of front-scanning data sets are grouped into eighteen adjacent groups, each covering an angular range of 10 degrees. For each of the groups, the processing unit 27 determines a smallest front distance $X_0$ shorter than the minimum safety distance and a corresponding direction relative to the main body 21 to constitute the obstacle location vector.

In step 68, the processing unit 27 calculates an obstacle composite vector based on the at least one obstacle location vector and the minimum safety distance.

Specifically, the obstacle composite vector is calculated using the following equation $$d_0 = \sum_{i=1}^{n} \left(1 - \frac{|d_i|}{D_{safe}}\right)^a \left(\frac{d_i}{|d_i|}\right),$$

where $d_0$ represents the obstacle composite vector, n represents a number of the at least one obstacle location vector (for example, in FIG. 11, two obstacles 41 are within the minimum safety distance from the robot 2 and thus there are two obstacle location vectors), $d_i$ represents an $i^{th}$ one of the at least one obstacle location vector, $D_{safe}$ represents the minimum safety distance, and a represents a predetermined factor between 0 and 1 (e.g., 0.5).

In step 69, the processing unit 27 calculates a dodging angular speed based on the orientation of the main body 21, the obstacle composite vector, the smallest one of the front distances and the linear speed.

Specifically, the dodging angular speed is calculated using the following equations $$\omega_0 = \begin{cases} \dfrac{V_g}{X_0'} & \theta_2 \leq 90° \\ \dfrac{-V_g}{X_0'} & \theta_2 > 90° \end{cases},$$

where $\omega_0$ represents the dodging angular speed, $V_g$ represents the linear speed, $X_0$ represents the smallest one of the front distances, and $\theta_2$ represents an angle between an imaginary reference axis 42 perpendicular to the forward-facing direction of the main body 21 and the obstacle composite vector. In the example of FIG. 11, the orientation of the main body 21 is that the main body 21 faces upwardly, and the imaginary reference axis 42 is a horizontal line.

In step 70, the processing unit 27 generates the movement command according to the linear speed, the angular speed, the dodging angular speed, the smallest one of the front distances and the minimum safety distance.

Figure 12:
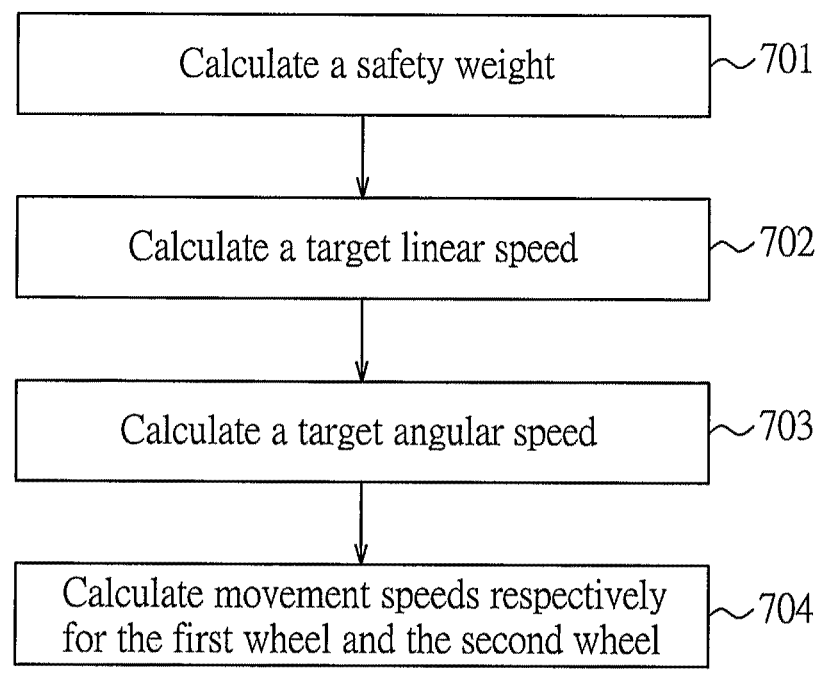
FIG. 12 is a flow chart illustrating sub-steps of a procedure for generating a movement command in response to detection of at least one obstacle.

Specifically, the operations of step 70 may be implemented using the following sub-steps as shown in FIG. 12.

In sub-step 701, the processing unit 27 calculates a safety weight using the following equation $$G_S = \left(\frac{X_0}{D_{safe}}\right)^b,$$

where $G_s$ represents the safety weight, and b represents a predetermined factor larger than 1 (e.g., 2).

In sub-step 702, the processing unit 27 calculates a target linear speed using the following equation $$V_n = G_s V_g,$$

where $V_n$ represents the target linear speed, and $V_g$ represents the linear speed.

In sub-step 703, the processing unit 27 calculates a target angular speed using the following equation $$\omega_n = G_s \omega_R + (1 - G_s)\omega_0,$$

where $\omega_n$ represents the target angular speed, and $\omega_g$ represents the angular speed.

In sub-step 704, the processing unit 27 calculates movement speeds respectively for the first wheel 241 and the second wheel 242 using the following equations $$V_1 = V_n - \omega_n \frac{L}{2}$$

$$V_2 = V_n + \omega_n \frac{L}{2},$$

where $V_1$ represent the movement speed for the first wheel 241, $V_2$ represents the movement speed for the second wheel, and L represents a distance between the first wheel 241 and the second wheel 242. As such, the processing unit 27 is configured to generate the movement command to include the movement speeds for the first and second wheels 241, 242.

It is noted that in other embodiments, various operations regarding obstacle avoidance may be implemented, and this aspect of the disclosure is not limited to the above description.

In response to the movement command, in step 72, the motion control unit 24 drives the main body 21 to move according to the movement command.

During the movement of the main body 21, in step 73, the processing unit 27 determines a current position of the main body 21 in the open space 3 based on the map and the plurality of front-scanning data sets currently obtained by the front laser scanner 22, and whether the main body 21 has arrived at the destination 312 according to the current position. When it is determined that the main body 21 has not arrived at the destination 312, the flow goes back to step 60, and the above method is repeated. Otherwise, the flow proceeds to step 74.

In step 74, the processing unit 27 transmits an update signal to the server 1 indicating that the main body 21 has arrived at the destination 312 (i.e., the follower 32 has been led to the destination 312 and no longer requires to be led).

In response to receipt of the update signal, in step 75, the server 1 updates the current location and the arrival time in the user information entry associated with the follower 32 respectively to the station location in the target station information entry and a time instant when the follower 32 arrived at the station 31 associated with the target station information entry. Afterward, the server 1 may perform step 51 again to determine whether another candidate user information entry is included in the plurality of user information entries.

To sum up, the embodiments of the disclosure provide an operation method for a robot 2 to lead a follower 32. In the method, the server 1 first determines one of the users to serve as the follower 32 (based on, for example, how long he/she has been waiting to be led) and a target station (based on, for example, the cost score) as the destination 312. Then, the robot 2 is directed by the server 1 to the start location 311 for leading the follower 32 to the destination 312.

During the movement, the processor 27 is configured to determine a distance between the follower 32 and the main body 21 based on the plurality of rear-scanning data sets from the rear laser scanner 23, to adjust a linear speed of the main body 21, and to stop moving altogether when the distance becomes too large. As a result, the risk of the follower 32 being unable to follow the movement of the robot 2 may be reduced.

Additionally, during the movement, the robot 2 is capable of determining whether an obstacle is in front of the robot 2 based on the front-scanning data sets from the front laser scanner 22, to avoid the obstacle.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An operation method of a robot for leading a follower from a start location to a destination within an open space, the robot including a main body, a front laser scanner that is disposed at a front side of the main body for scanning the front of the main body, a rear laser scanner that is disposed at a rear side of the main body for scanning the rear of the main body, a storage unit that stores a map of the open space,
a motion control unit disposed at the main body for driving the main body to move within the open space, and a processing unit communicating with the front laser scanner, the rear laser scanner and the motion control unit, the method comprising steps of:
scanning, by the rear laser scanner, the rear of the main body within a plurality of rear angular ranges to obtain a plurality of rear-scanning data sets that correspond to the plurality of rear angular ranges, respectively;
A) calculating, by the processing unit, a distance between the follower and the main body based on the plurality of rear-scanning data sets currently obtained by the rear laser scanner;
B) determining, by the processing unit, whether the distance between the follower and the main body is greater than a threshold;
C) when it is determined that the distance between the follower and the main body is not greater than the threshold,
controlling, by the processing unit, the front laser scanner to scan the front of the main body within a plurality of front angular ranges, so as to obtain a plurality of front-scanning data sets that correspond to the plurality of front angular ranges, respectively,
determining, by the processing unit, a pre-movement location of the main body in the open space and an orientation of the main body based on the map and the plurality of front-scanning data sets currently obtained by the front laser scanner, and
determining, by the processing unit, a linear speed and an angular speed for the main body based on at least the pre-movement location and the orientation of the main body, the destination and the map;
D) generating, by the processing unit, a movement command according to the linear speed and the angular speed and transmitting, by the processing unit, the movement command to the motion control unit;
E) driving, by the motion control unit, the main body to move according to the movement command;
F) determining, by the processing unit, a current position of the main body in the open space based on the map and the plurality of front-scanning data sets currently obtained by the front laser scanner, and whether the main body has arrived at the destination according to the current position; and
G) repeating steps A) to F) when it is determined that the main body has not arrived at the destination; wherein each of the plurality of rear-scanning data sets includes the corresponding one of the rear angular ranges and a measured distance that is measured along a middle angle within the corresponding one of the rear angular ranges,
wherein step A) includes the sub-steps of:
A1) grouping the plurality of rear-scanning data sets into a plurality of data groups, wherein, in each of the plurality of data groups, the rear angular ranges respectively of the rear-scanning data sets in the data group are non-overlapping and cooperatively constitute the entirety of an uninterrupted, broader angular range, and a difference between the measured distances respectively of two rear-scanning data sets including the rear angular ranges that are adjacent to each other is smaller than a predetermined floor threshold;
A2) selecting, from the plurality of data groups, two target data groups that correspond respectively with locations of two legs of the follower;
A3) calculating a leg coordinate set relative to the rear laser scanner based on the target data groups; and
A4) calculating the distance between the follower and the main body based on the leg coordinate set.

2. The method of claim 1, wherein sub-step A2) includes:
A21) selecting, from the plurality of data groups, a plurality of candidate data groups, a number of the rear-scanning data sets in each of the plurality of candidate data groups being larger than a predetermined number;
A22) for each of the candidate data groups, calculating a width, a circumference and a depth of an object detected by the rear laser scanner based on the rear-scanning data sets of the candidate data group;
A25) for each of the candidate data groups, identifying the candidate data group as a selected data group when the width, the circumference and the depth of the object respectively satisfy corresponding predetermined conditions;

A26) for each of the selected data groups, calculating a coordinate set associated with a center of the object; and A27) identifying two of the selected data groups, a distance between the coordinate sets respectively of which satisfying a leg distance condition, as the target data groups.

3. The operation method of claim 1, wherein calculating the linear speed $V_g$ in step C) includes:

determining a distance-to-destination between the pre-movement location of the main body and the destination;

setting a fixed linear speed as the linear speed $V_g$ when the distance-to-destination is greater than a predetermined distance; and calculating the linear speed $V_g$ based on the pre-movement location, the fixed linear speed, the distance-to-destination and the predetermined distance when the distance-to-destination is not greater than the predetermined distance.

4. The operation method of claim 1, wherein calculating the angular speed $\omega_g$ in step C) includes:

determining an angle-of-destination between a forward-facing direction of the main body and an imaginary line connecting the main body to the destination;

calculating the angular speed $\omega_g$ based on orientation of the main body, the imaginary line, the angle-of-destination and a predetermined angular speed when the angle-of-destination is greater than a predetermined angle; and calculating the angular speed $\omega_g$ based on orientation of the main body, the imaginary line, the angle-of-destination, the predetermined angle and the predetermined angular speed when the angle-of-destination is not greater than the predetermined angle.

5. The method of claim 1, the map of the open space being constructed using Cartographer SLAM, wherein in step C), the location of the main body is determined using adaptive Monte Carlo localization (AMCL).

6. An operation method of a robot for leading a follower from a start location to a destination within an open space, the robot including a main body, a front laser scanner that is disposed at a front side of the main body for scanning the front of the main body, a rear laser scanner that is disposed at a rear side of the main body for scanning the rear of the main body, a storage unit that stores a map of the open space, a motion control unit disposed at the main body for driving the main body to move within the open space, and a processing unit communicating with the front laser scanner, the rear laser scanner and the motion control unit, the method comprising steps of:

scanning, by the rear laser scanner, the rear of the main body within a plurality of rear angular ranges to obtain a plurality of rear-scanning data sets that correspond to the plurality of rear angular ranges, respectively;

A) calculating, by the processing unit, a distance between the follower and the main body based on the plurality of rear-scanning data sets currently obtained by the rear laser scanner;

B) determining, by the processing unit, whether the distance between the follower and the main body is greater than a threshold;

C) when it is determined that the distance between the follower and the main body is not greater than the threshold, controlling, by the processing unit, the front laser scanner to scan the front of the main body within a plurality of front angular ranges, so as to obtain a plurality of front-scanning data sets that correspond to the plurality of front angular ranges, respectively, determining, by the processing unit, a pre-movement location of the main body in the open space and an orientation of the main body based on the map and the plurality of front-scanning data sets currently obtained by the front laser scanner, and determining, by the processing unit, a linear speed and an angular speed for the main body based on at least the pre-movement location and the orientation of the main body, the destination and the map;

D) generating, by the processing unit, a movement command according to the linear speed and the angular speed and transmitting, by the processing unit, the movement command to the motion control unit;

E) driving, by the motion control unit, the main body to move according to the movement command;

F) determining, by the processing unit, a current position of the main body in the open space based on the map and the plurality of front-scanning data sets currently obtained by the front laser scanner, and whether the main body has arrived at the destination according to the current position; and G) repeating steps A) to F) when it is determined that the main body has not arrived at the destination;

wherein each of the plurality of front-scanning data sets includes the corresponding one of the front angular ranges and a front distance that is measured along a middle angle within the corresponding one of the front angular ranges, the method further comprising, after step C), steps of:

H) determining, by the processing unit, whether there is at least one obstacle in front of the robot within a minimum safety distance from the robot by determining whether at least one of the front distances respectively of the plurality of front-scanning data sets is shorter than the minimum safety distance;

I) when it is determined that there is at least one obstacle in front of the robot within the minimum safety distance from the robot, obtaining, by the processing unit, at least one obstacle location vector relative respectively to the at least one obstacle within the minimum safety distance from the robot and a smallest one of the front distances based on the plurality of front-scanning data sets;

J) calculating, by the processing unit, an obstacle composite vector based on the at least one obstacle location vector and the minimum safety distance; and K) calculating, by the processing unit, a dodging angular speed based on the orientation of the main body, the obstacle composite vector, the smallest one of the front distances and the linear speed;

wherein in step D), the movement command is generated further according to the dodging angular speed.

7. The operation method of claim 6, wherein in step J), the obstacle composite vector is calculated using the following equation $$d_0 = \sum_{i=1}^{n} \left(1 - \frac{|d_i|}{D_{safe}}\right)^a \left(\frac{d_i}{|d_i|}\right),$$

where $d_0$ represents the obstacle composite vector, n represents a number of the at least one obstacle location vector, $d_i$ represents an $i^{th}$ one of the at least one obstacle location vector, $D_{safe}$ represents the minimum safety distance, and a represents a predetermined factor between 0 and 1.

8. The operation method of claim 7, wherein in step K), the dodging angular speed is calculated using the following equation $$\omega_0 = \begin{cases} \dfrac{V_g}{X_0'} & \theta_2 \leq 90° \\ \dfrac{-V_g}{X_0'} & \theta_2 > 90° \end{cases},$$

where $\omega_0$ represents the dodging angular speed, $V_g$ represents the linear speed, $X_0$ represents the smallest one of the front distances, and $\theta_2$ represents an angle between an imaginary reference axis perpendicular to forward-facing direction of the main body and the obstacle composite vector.

9. The operation methods of claim 8, the motion control unit including a first motor and a second motor, a first wheel driven by the first motor, and a second wheel driven by the second motor, wherein step D) includes:
  D1) calculating a safety weight using the following equation $$G_S = \left(\dfrac{X_0}{D_{safe}}\right)^b$$

where $G_s$ represents the safety weight, and b represents a predetermined factor larger than 1;
  D2) calculating a target linear speed using the following equation $$V_n = G_s V_g$$

where $V_n$ represents the target linear speed, and $V_g$ represents the linear speed;
  D3) calculating a target angular speed using the following equation $$\omega_n = G_s \omega_g + (1 - G_s)\omega_0$$

where $\omega_n$ represents the target angular speed, and $\omega_g$ represents the angular speed;
  D4) calculating a movement speed for each of the first wheel and the second wheel using the following equations $$V_1 = V_n - \omega_n \dfrac{L}{2}$$

$$V_2 = V_n + \omega_n \dfrac{L}{2}$$

where $V_1$ represents the movement speed for the first wheel, $V_2$ represents the movement speed for the second wheel, and L represents a distance between the first wheel and the second wheel; and
  D5) generating the movement command to include the movement speeds for the first and second wheels.

10. An operation method of a robot for leading a follower from a start location to a destination within an open space, the robot including a main body, a front laser scanner that is disposed at a front side of the main body for scanning the front of the main body, a rear laser scanner that is disposed at a rear side of the main body for scanning the rear of the main body, a storage unit that stores a map of the open space, a motion control unit disposed at the main body for driving the main body to move within the open space, and a processing unit communicating with the front laser scanner, the rear laser scanner and the motion control unit, the method comprising steps of:
  scanning, by the rear laser scanner, the rear of the main body within a plurality of rear angular ranges to obtain a plurality of rear-scanning data sets that correspond to the plurality of rear angular ranges, respectively;
  A) calculating, by the processing unit, a distance between the follower and the main body based on the plurality of rear-scanning data sets currently obtained by the rear laser scanner;
  B) determining, by the processing unit, whether the distance between the follower and the main body is greater than a threshold;
  C) when it is determined that the distance between the follower and the main body is not greater than the threshold,
  controlling, by the processing unit, the front laser scanner to scan the front of the main body within a plurality of front angular ranges, so as to obtain a plurality of front-scanning data sets that correspond to the plurality of front angular ranges, respectively,
  determining, by the processing unit, a pre-movement location of the main body in the open space and an orientation of the main body based on the map and the plurality of front-scanning data sets currently obtained by the front laser scanner, and
  determining, by the processing unit, a linear speed and an angular speed for the main body based on at least the pre-movement location and the orientation of the main body, the destination and the map;
  D) generating, by the processing unit, a movement command according to the linear speed and the angular speed and transmitting, by the processing unit, the movement command to the motion control unit;
  E) driving, by the motion control unit, the main body to move according to the movement command;
  F) determining, by the processing unit, a current position of the main body in the open space based on the map and the plurality of front-scanning data sets currently obtained by the front laser scanner, and whether the main body has arrived at the destination according to the current position; and
  G) repeating steps A) to F) when it is determined that the main body has not arrived at the destination; wherein the method is further implemented using a server that communicates with the robot and that stores a plurality of user information entries associated respectively with a plurality of users and a plurality of station information entries associated respectively with a plurality of stations in the open space, each of the plurality of user information entries including a progress report indicating whether the user has visited each of the stations, a current location of a current station where the user is currently staying in the open space, and an arrival time when the user arrived at the current station, each of the plurality of station information entries including a station location of the station in the open space and an expected staying duration, during which a user is expected to stay at the station, the method further comprising, prior to step A), steps of:
  L) determining, by the server, whether a candidate user information entry is included in the plurality of user information entries according to the progress reports respectively of the plurality of user information entries, the progress report in the candidate user information entry being associated with a to-be-guided user and indicating at least one station that is yet to be visited by the to-be-guided user;

O) selecting, by the server, a target station from the at least one station based on the candidate user information entry;

P) setting, by the server, the station information entry that is associated with the target station as a target station information entry;

Q) transmitting, by the server, the current location in the candidate user information entry and the station location in the target station information entry to the robot; and R) performing, by the robot, steps A) to F) in response to receipt of the current location and the station location, using the to-be-guided user associated with the task user information entry as the follower, the current location as the start location and the station location as the destination.

11. The operation method of claim 10, further comprising, between steps L) and O), steps of:

M) when it is determined that a plurality of task user information entries are included in the plurality of user information entries, calculating, by the server for each of the task user information entries, an in-station duration based on a current time and the arrival time in the candidate user information entry, and a waiting time based on the in-station duration and the expected staying duration in one of the plurality of station information entries that is associated with the station that is located at the current location in the candidate user information entry; and N) identifying one of the candidate user information entries corresponding to a longest waiting time, and performing step O) with respect to the one of the candidate user information entries.

12. The operation method of claim 10, further comprising, when it is determined in step F) that the main body has arrived at the destination:

S) by the processing unit, transmitting an update signal to the server; and

T) updating, by the server in response to receipt of the update signal, the current location and the arrival time in the user information entry associated with the to-be-guided user respectively to the station location in the target station information entry and a time instant when the to-be-guided user arrives at the station associated with the target station information entry.

13. The operation method of claim 10, wherein step O) includes sub-steps of:

O1) when it is determined that there are a plurality of stations that are yet to be visited by the to-be-guided user, obtaining, by the server, station information entries associated with the plurality of stations, respectively;

O2) for each of the station information entries associated with the plurality of stations that are yet to be visited by the to-be-guided user, calculating a moving time based on the current location in the candidate user information entry and the station location in the station information entry;

O3) for each of the station information entries associated with the plurality of stations that are yet to be visited by the to-be-guided user, determining whether the current location in any one of the plurality of user information entries conforms with the station location in the station information entry;

O4) for each of the station information entries associated with the plurality of stations that are yet to be visited by the to-be-guided user, when it is determined that the current location in one of the plurality of user information entries conforms with the station location in the station information entry, calculating an expected available time based on the expected staying duration in the station information entry, a current time, and the arrival time in said one of the plurality of user information entries;

O5) calculating, for each one of the station information entries associated with the plurality of stations that are yet to be visited by the to-be-guided user, a cost score based on the moving time and the expected available time; and O6) selecting one of the stations having the station information entry with a lowest cost score as the target station.

* * * * *